United States Patent
Rumpf et al.

[11] Patent Number: 5,098,000
[45] Date of Patent: Mar. 24, 1992

[54] DEVICE FOR ADJUSTING THE AZIMUTH POSITION OF A CAPSTAN IN A MAGNETIC TAPE APPARATUS

[75] Inventors: Horst H. Rumpf, Hernborn Schönbach; Karl Klös-Hein, Wettenberg, both of Fed. Rep. of Germany

[73] Assignee: U.S. Philips Corporation, New York, N.Y.

[21] Appl. No.: 680,627

[22] Filed: Mar. 29, 1991

Related U.S. Application Data
[63] Continuation of Ser. No. 333,487, Apr. 5, 1989, abandoned.

[30] Foreign Application Priority Data
Aug. 4, 1987 [DE] Fed. Rep. of Germany ....... 3811725

[51] Int. Cl.⁵ .................. B65H 17/20; F16C 27/00
[52] U.S. Cl. .................. 226/194; 384/215; 384/247
[58] Field of Search .................. 226/194; 74/390; 384/192, 247, 252, 253, 257, 519, 583, 215

[56] References Cited
U.S. PATENT DOCUMENTS

| | | | |
|---|---|---|---|
| 429,880 | 6/1890 | Bogert | 384/257 X |
| 2,998,906 | 9/1961 | Vice et al. | 226/187 |
| 3,185,532 | 5/1965 | Loch | 384/215 |
| 3,700,298 | 10/1972 | Hay | 384/519 |
| 3,949,919 | 4/1976 | Takei | 226/194 |
| 4,270,685 | 6/1981 | Motogama | 226/194 |
| 4,283,095 | 8/1981 | Osanai | 226/194 X |
| 4,648,563 | 3/1987 | Tollefson | 226/194 X |
| 4,655,614 | 7/1987 | Schott | 384/215 X |

FOREIGN PATENT DOCUMENTS

| | | | |
|---|---|---|---|
| 1249341 | 9/1967 | Fed. Rep. of Germany. | |
| 0122924 | 8/1986 | Japan | 384/247 |
| 1368518 | 1/1988 | U.S.S.R. | 384/247 |

*Primary Examiner*—Daniel P. Stodola
*Assistant Examiner*—P. Bowen

[57] ABSTRACT

The invention relates to a device for adjusting the azimuth position of a capstan in a magnetic-tape apparatus relative to a reference plane, comprising a bearing plate which supports a capstan bearing through which the capstan extends. The capstan bearing or a part of this bearing is connected to the bearing plate by at least three single or multiple U-shaped supporting strips of a sheet material, which strips engage and are equidistantly spaced around the capstan bearing, the U-shapes extending in the plane of the supporting strips.

9 Claims, 2 Drawing Sheets

DEVICE FOR ADJUSTING THE AZIMUTH POSITION OF A CAPSTAN IN A MAGNETIC TAPE APPARATUS

This is a continuation of copending application Ser. No. 07/333,487 filed on Apr. 5, 1989, now abandoned.

BACKGROUND OF THE INVENTION

The invention relates to a device for adjusting the azimuth position of a capstan in a magnetic-tape apparatus relative to a reference plane, comprising a bearing plate which supports a capstan bearing in which the capstan is journalled.

When capstan bearings are mounted in a supporting plate, which defines a reference plane in relation to the head face, which extends perpendicularly to this plane, they cannot be positioned with such accuracy that the subsequently mounted capstan actually occupies the correct azimuth position relative to the pressure rollers and head faces. It is known to correct the azimuth position of a capstan in that the capstan bearing is rotated through a specific angle, causing the bearing support to be tilted. However, such a construction can be applied only to provide correction within a limited range.

SUMMARY OF THE INVENTION

It is an object of the invention to provide a device of the type defined in the opening paragraph, which is stable and simple and which enables any desired azimuth position to be adjusted without any problems.

According to the invention this object is achieved in that the capstan bearing or a part thereof is connected to the bearing plate via at least three single or multiple U-shaped supporting strips of sheet-metal, which engage and are equidistantly spaced around the capstan bearing, the U-shapes extending in the plane of the supporting strips.

The single or multiple U-shaped supporting strips also enable the centrally disposed capstan bearing to be easily brought into the desired position by bending said strips.

In a further embodiment of the invention preformed bending spots are provided at the locations where the strips engage with the capstan bearing and with the bearing plate as well as at the locations of the junctions of the limbs of the U-shaped supporting strips. Such preformed bending spots lead to a reduced resistance to bending.

In a further embodiment of the invention the preformed bending spots take the form of constrictions in the strips, and in a further modification the constrictions are arcuate. Constrictions having arcuate edges which recede into the strips provide a further reduction of the resistance to bending.

In cases that, in principle, three supporting strips are adequate it may be advantageous to employ four supporting strips arranged as a cross.

In a further embodiment of the invention the supporting strips are formed by removing the peripheral material of the bearing plate and the capstan bearing is mounted in a supporting ring which interconnects the supporting strips in the centre and which consists of the non-removed material of the bearing plate. If the supporting strips are thus formed from the bearing plate itself together with a central supporting ring in which the capstan bearing can be mounted, the device for adjusting the azimuth position can be formed simultaneously with the bearing plate. Consequently, no separate operations are needed to mount the device for adjusting the azimuth position.

BRIEF DESCRIPTION OF THE DRAWINGS

The invention will now be described in more detail, by way of example, with reference to the accompanying drawings. In the drawings.

DESCRIPTION OF THE PREFERRED EMBODIMENTS

Figure 1:
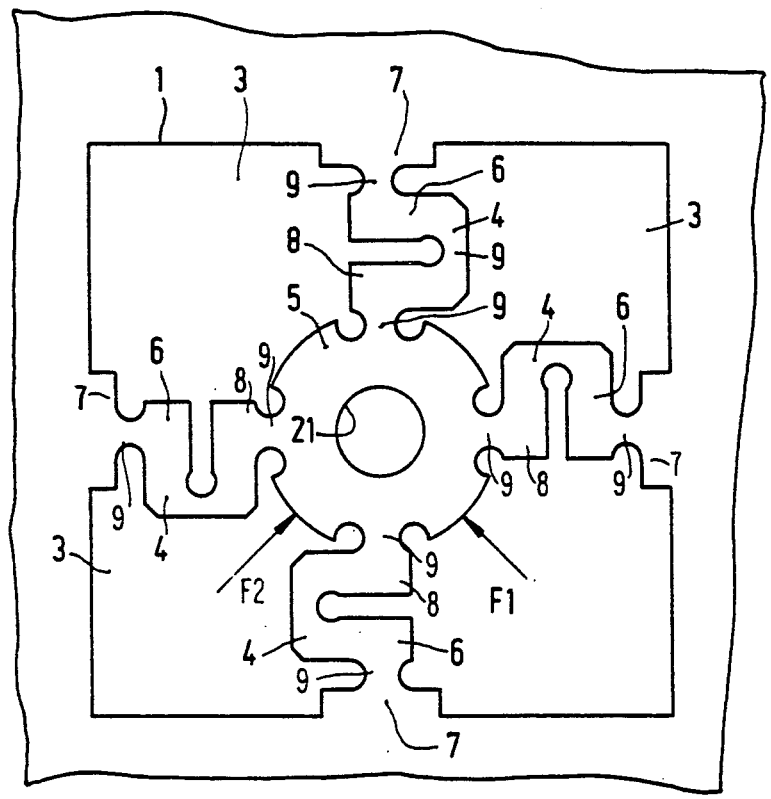
FIG. 1 shows a part of a thrust-bearing plate comprising U-shaped or meander-shaped supporting strip for a supporting ring which carries an end support for a capstan.

FIG. 1 shows a thrust-bearing plate 1 formed with recessed portions or punched-out openings 3. Supporting strips 4 left between the punched-out openings 3 connect the thrust-bearing plate to a central supporting ring 5. There are four supporting strips 4 arranged as a cross.

Each supporting strip has a U-shaped or meandering portion. The limbs 6 each engage against the transitional portion 7 of the thrust-bearing plate and the limbs 8 carry the supporting ring 5. Constrictions 9 are formed at the junctions between the portions 7 of the thrust-bearing plate and a limb 6 at the location of the base of the U and at the junctions between the limbs 8 and the supporting ring 5. These constrictions have inwardly arcuate edges and facilitate bending of the entire structure.

By applying forces $F_1$ the strips 4 in the thrust-bearing plate 1 are subjected to such a plastic deformation that the centre hole 21 of the supporting ring 5 is offset by a desired amount in the plane XY of the thrust-bearing plate. This enables the capstan 11 (FIG. 2) to be adjusted in a direction perpendicular to a reference plane 12, which may be, for example, the cassette-supporting surface 13.

Figure 2:
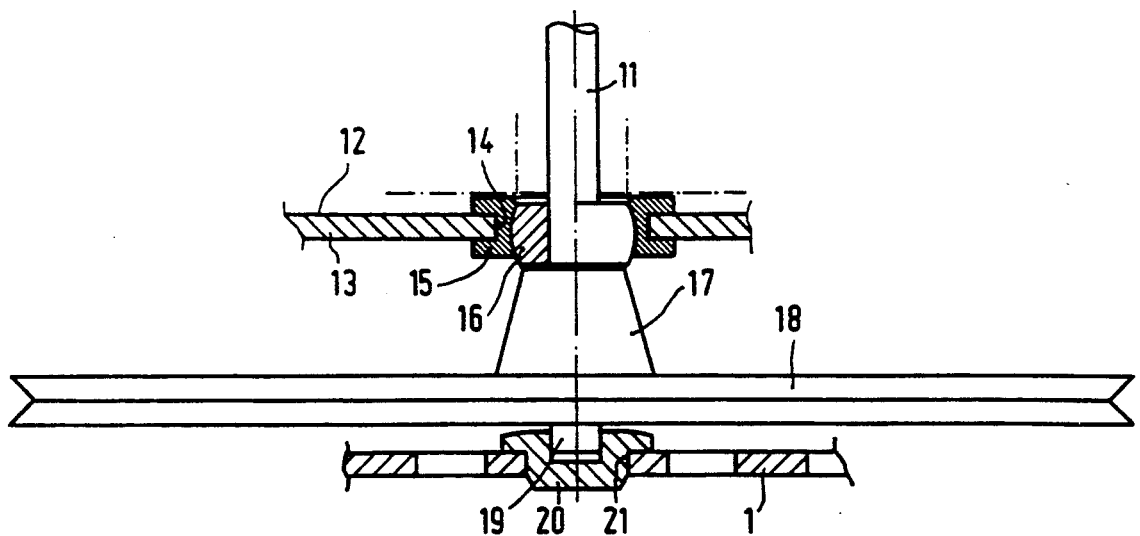
FIG. 2 is a sectional view of the entire capstan-bearing arrangement comprising an end support in a thrust-bearing plate.

FIG. 2 shows an example of a bearing arrangement, but this construction need not necessarily be used. In the cassette supporting surface 13, i.e. in a hole 14 formed therein, a plastic ring 15 is clamped, which ring carries a spherical bearing 16. The capstan 11 is passed through the bearing 16.

A flywheel 18 is fixedly connected to the capstan via a reinforcement cone and is driven by means of a V-belt. Underneath the flywheel 18 a journal 19 of the capstan 11 engages in an end support 20 of the capstan-bearing arrangement. This end support 20 is mounted in a hole 21 in the supporting ring 5.

If the supporting ring 5 is offset in the X/Y direction in the plane of the thrust-bearing plate 1 under the influence of the forces $F_1$, $F_2$ applied to it, this will influence the azimuth position of the capstan 11 relative to the cassette-supporting surface 13. Thus, by adjusting the supporting ring 5 it is possible to adjust the azimuth position of the capstan relative to the pressure rollers and the head face of the magnetic head. Adjustment can be effected simply by means of a tool.

Figure 3:
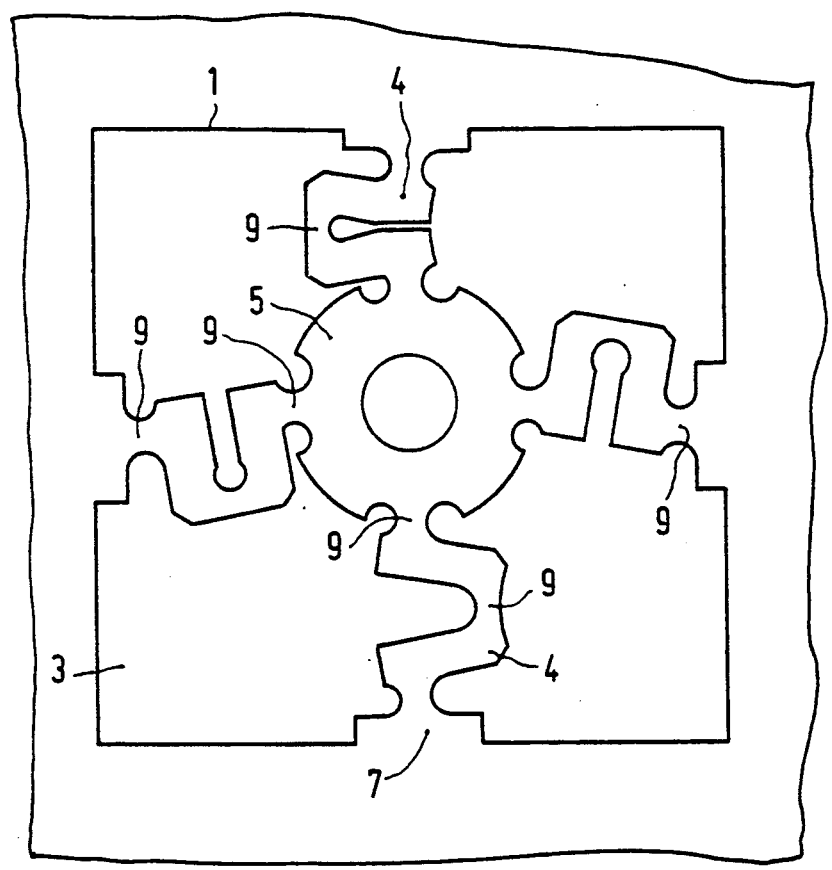
FIG. 3 shows the device of FIG. 1 with the supporting ring in an offset position.

In the situation illustrated in FIG. 3 the forces $F_1$ and $F_2$ have offset the supporting ring, the force $F_1$ being greater than the force $F_2$. The Figure shows how this affects the constrictions.

We claim:

1. A device for adjusting the azimuth of a capstan relative to a reference plane in a magnetic-tape apparatus, comprising:

capstan bearing supporting means (5) for supporting a capstan bearing, said supporting means including an opening (21);

a capstan bearing (20) contained within said opening (21), in which capstan bearing (20) a capstan is capable of being journaled; and a plate (1) which at least partially encircles said capstan bearing supporting means (5); and at least three U-shaped supporting strips of material (4) having first and second at least generally parallel limbs and means for connecting the first limb of each of said three U-shaped strips of material to said capstan bearing supporting means and means for connecting the second limb of each of the U-shaped strips to the plate for permitting the position of the capstan bearing to be adjusted laterally with respect to the plate.

2. A device as claimed in claim 1, wherein the means for connecting the first limb of each of said three U-shaped strips of metal to said capstan bearing supporting means comprises a first preformed bending spot;

said means for connecting the second limb of each of the U-shaped strips of material to the plate comprises a second preformed bending spot; and further comprising a third preformed bending spot disposed between and connecting said first and second limbs.

3. A device as claimed in claim 2, wherein each of said first, second and third preformed bending spots includes a constriction of the corresponding supporting strip.

4. A device as claimed in claim 3, wherein each constriction includes an arcuate edge.

5. A device as claimed in claim 3, in which the supporting strips and the bearing supporting means comprise a unitary sheet metal element.

6. A device as claimed in claim 2 in which the supporting strips and the bearing supporting means comprise a unitary sheet metal element.

7. A device as claimed in claim 1, wherein said plate is connected to said means by four U-shaped supporting strips arranged as a cross.

8. A device as claimed in claim 7, in which the supporting strips and the bearing supporting means comprise a unitary sheet metal element.

9. A device as claimed in claim 1, in which the supporting strips and the bearing supporting means comprise a unitary sheet metal element.

* * * * *